(12) United States Patent
Schlichter

(10) Patent No.: US 12,161,104 B2
(45) Date of Patent: Dec. 10, 2024

(54) MOUSE TRAP

(71) Applicant: Maximiliano Lucas Schlichter, London (GB)

(72) Inventor: Maximiliano Lucas Schlichter, London (GB)

( * ) Notice: Subject to any disclaimer, the term of this patent is extended or adjusted under 35 U.S.C. 154(b) by 78 days.

(21) Appl. No.: 17/969,760

(22) Filed: Oct. 20, 2022

(65) Prior Publication Data

US 2023/0130763 A1 Apr. 27, 2023

(51) Int. Cl.
*A01M 23/26* (2006.01)
*A01M 23/18* (2006.01)
*A01M 23/24* (2006.01)

(52) U.S. Cl.
CPC .......... *A01M 23/26* (2013.01); *A01M 23/18* (2013.01); *A01M 23/265* (2013.01); *A01M 23/245* (2013.01)

(58) Field of Classification Search
CPC ...... A01M 23/14; A01M 23/02; A01M 23/18; A01M 23/265; A01M 23/26; A01M 23/24
See application file for complete search history.

(56) References Cited

U.S. PATENT DOCUMENTS

| | | | | |
|---|---|---|---|---|
| 451,015 A * | 4/1891 | Barkley | ............... | A01M 23/26 43/92 |
| 622,700 A * | 4/1899 | Mackintosh | .......... | A01M 23/26 43/88 |
| 1,038,672 A | 9/1912 | Sprague | | |
| 1,118,752 A * | 11/1914 | Estrada | ............... | A01M 23/265 43/94 |
| 1,135,626 A * | 4/1915 | Schreck | ............... | A01M 23/265 43/94 |
| 1,464,748 A | 8/1923 | Crago | | |
| 1,466,332 A | 8/1923 | Crago | | |
| 1,548,761 A * | 8/1925 | Sidler | ................. | A01M 23/265 43/94 |
| 2,432,723 A * | 12/1947 | Carpenter | ............. | A01M 23/26 43/88 |
| 2,436,985 A * | 3/1948 | Abeel | ................ | A01M 23/265 43/91 |
| 2,490,017 A * | 12/1949 | Crumrine | ............. | A01M 23/14 43/99 |
| 2,869,280 A | 1/1959 | Dobratz | | |
| 4,070,787 A * | 1/1978 | Oakes | ................... | A01M 23/26 43/94 |
| 2008/0236023 A1 | 10/2008 | Thomas et al. | | |
| 2013/0174469 A1 | 7/2013 | Kittelson | | |

FOREIGN PATENT DOCUMENTS

CN 106561628 A 4/2017
CN 110367235 A 10/2019

OTHER PUBLICATIONS

Search Report for Application GB2215127.8 (Feb. 15, 2023).

\* cited by examiner

*Primary Examiner* — Jessica B Wong

(57) ABSTRACT

A mouse trap including a frame, a first trapping member, a second trapping member, and actuator means for causing the first and second trapping members to move from an open position to a closed position. The first and second trapping members are pivotable such that they each pivot horizontally in an arc towards each other from the open position to the closed position. The first and second trapping members are configured to trap a mouse when the first and second trapping members are in the closed position.

18 Claims, 8 Drawing Sheets

MOUSE TRAP

RELATED APPLICATIONS

This application claims benefit of and priority to United Kingdom Patent Application Serial No. GB2115182.4 filed Oct. 21, 2021 under 35 U.S.C. §§ 119, 120, 363, 365, and 37 C.F.R. § 1.55 and § 1.78, which is incorporated herein by this reference.

FIELD OF THE INVENTION

This invention relates to a mouse trap.

BACKGROUND OF THE INVENTION

Known mouse traps are often ineffective because a mouse needs to get into or over the mouse trap. This tends to cause the mouse to become suspicious and the mouse may then avoid getting close to the mouse trap in the first place.

It is an aim of the present invention to avoid or reduce the above-mentioned problem.

SUMMARY OF THE INVENTION

Accordingly, in one non-limiting embodiment of the present invention there is provided a mouse trap comprising:
(i) a frame;
(ii) a first trapping member;
(iii) a second trapping member;
(iv) actuator means for causing the first and second trapping members to move from an open position to a closed position,
and wherein:
(v) the first and second trapping members are pivotable such that they each pivot horizontally in an arc towards each other from the open position to the closed position; and
(vi) the first and second trapping members are configured to trap a mouse when the first and second trapping members are in the closed position.

The operation of the first and second trapping members such that they each pivot horizontally in an arc towards each other from the closed position to the open position enables the mouse trap to be configured such that it is not necessary for the mouse to get into or over the mouse trap for the mouse trap to operate via the actuator means. This helps to avoid the mouse becoming suspicious and then avoiding the mouse trap completely.

The mouse trap may be one in which the frame is such that in use of the mouse trap, the frame does not extend to the front of the mouse trap and thus is not walked over by a mouse activating the actuator means. Thus, the frame is able to be used to avoid the mouse having to get into or over the mouse trap. In addition, the frame is able to be used to enable the mouse trap to be self-standing.

Preferably, the mouse trap is one in which the actuator means is an electrically-operated sensor means. If desired however the actuator means may be another type of actuator means such for example as a mechanical actuator means.

When the actuator means is an electrically-operated sensor means, then the electrically-operated sensor means may be a movement sensor means. The movement sensor may be a passive infrared sensor.

The mouse trap may be one in which there is one of the electrically-operated sensor means. Alternatively, the mouse trap may be one in which there is an array of the electrically-operated sensor means. The electrically-operated sensor means may be positioned on the frame to sense downwardly over the arcs traversed by the first and second trapping members.

With an array of the electrically-operated sensor means, the array may be configured with a fail-safe means for avoiding the actuator means becoming falsely actuated if a larger animal becomes present in the mouse-sensing zone, which in effect is a triggering zone. More specifically, if only a small animal such for example as a mouse is present in the sensing zone, then only a central sensor in the array may detect the small animal. If more than one sensor in the array detects an animal, for example a central sensor and one other sensor, then this is able to indicate electronically that a larger animal is present and the actuator means will then not be actuated.

The mouse trap may include a pivot arrangement which extends vertically, and in which the first and second trapping members pivot horizontally in their arcs about the pivot arrangement.

The mouse trap may be one in which the pivot arrangement comprises a single pivot member, and in which the first and second trapping members are mounted about the single pivot member. Alternative pivot arrangements may be employed. Thus, for example, the pivot arrangement may comprise two separate pivot members with each pivot member being for one of the first and second trapping members.

The mouse trap may be one in which the first and second trapping members form a closed container in the closed position of the first and second trapping members. Other constructions for the first and second trapping members may be employed.

When the first and second trapping members form a closed container then the closed container may be a sealed container. With a sealed container, the mouse will suffocate inside the closed container. The closed container may in other embodiments of the invention be a non-sealed container or an open framework container.

Preferably, the first and second trapping members are open containers which define a closed container in the closed position of the first and second trapping members. The closed container is then able to be provided with sealing means for forming a sealed container.

The mouse trap may be one in which in the use position the first and second trapping members each comprises a vertical rear wall, and peripheral walls which extend forwardly away from the rear wall and which define an open mouth, and in which the peripheral walls of the first and second trapping members abut each other in the closed position of the first and second trapping members and thereby define a closed container of a size for receiving a mouse.

The mouse trap may be one in which the first and second trapping members are spring biased to the closed position.

The mouse trap may be one in which there is a first spring member for the first trapping member, and a second spring member for the second trapping member. With such an arrangement, each spring member may be arranged to pull on its trapping member. Thus, for example, the first and second spring members may each be provided with a lug, and the springs may be connected to the central lugs. One spring may be an upper spring and the other spring may be a lower spring. With such an arrangement, both springs are able to pull against their trapping member. Alternatively, if desired, the springs may pull against a fixed anchor, for example on the frame.

Preferably, the mouse trap is one in which the first spring member is a first coil spring, and in which the second spring member is a second coil spring. Other types of springs may be employed.

The mouse trap may be one in which the frame includes a battery-receiving formation for receiving a battery for operating the actuator means.

The mouse trap may be one in which the first and second trapping members each comprises an adhesive to which the mouse sticks. The use of the adhesive is an alternative to the arrangement in many known mouse traps in which the bar slams shut on the mouse, for example just behind the neck of the mouse. The adhesive may be provided on the first and second trapping members. The first and second trapping members can then be configured as disposable first and second trapping members. The disposable first and second trapping members may be made of any suitable and appropriate material, for example cardboard sheet. With disposable first and second trapping members, the apparatus of the present invention may enable the dead mouse to be disposed of in an hygienic manner and/or without the mouse being seen and/or without body fluids from the mouse being seen. After disposal of the mouse, replacement first and second disposable trapping members may be inserted into position in the mouse trap.

The mouse trap may be one in which the first and second trapping members have an injury-preventing material, for example a plastics or rubber material, over their edges in order to reduce the risk of the first and trapping members injuring a user or a pet. The injury-protecting material may be a plastics foam material.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
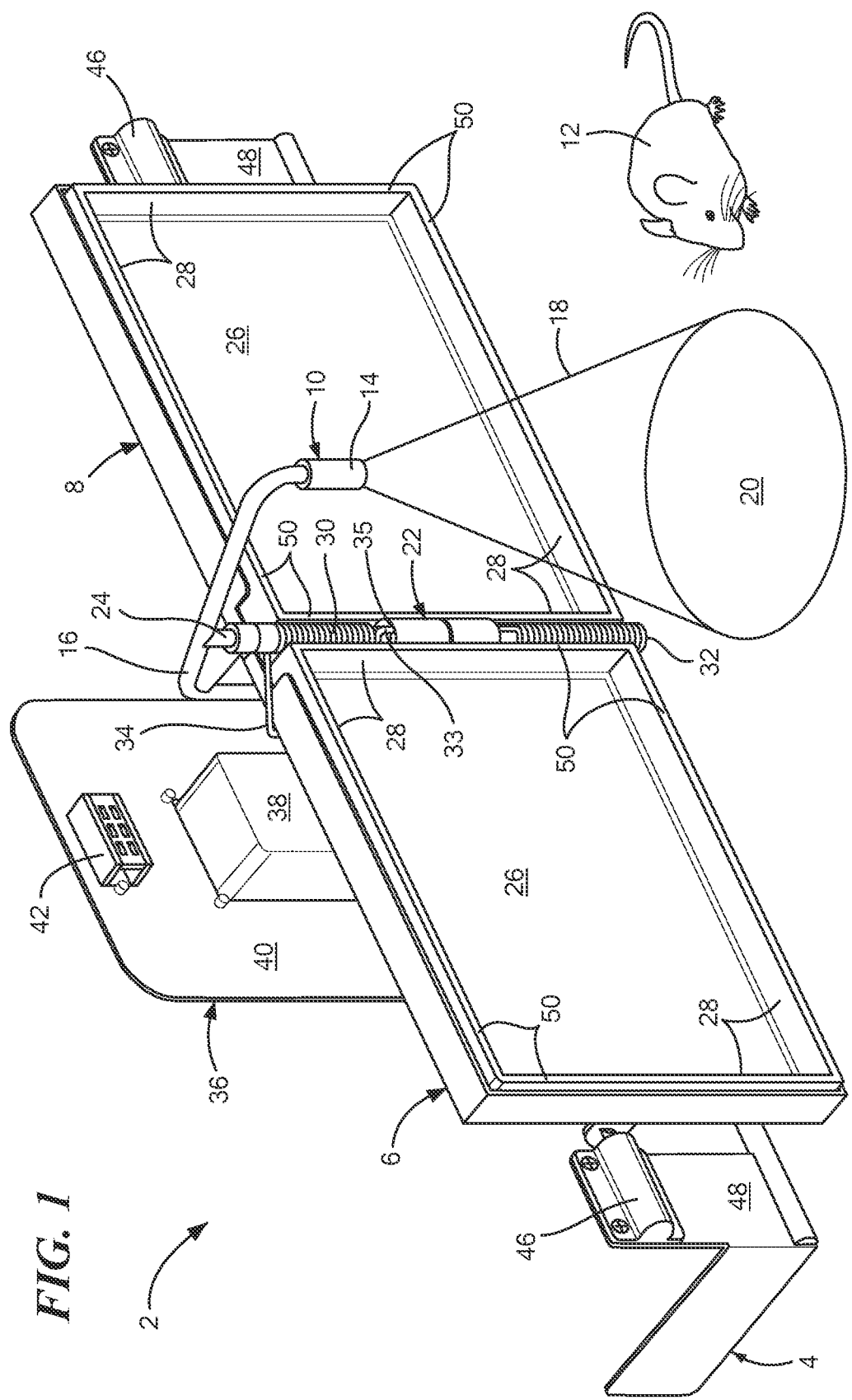
FIG. 1 shows a first mouse trap of the present invention and in an open ready-to-operate position.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
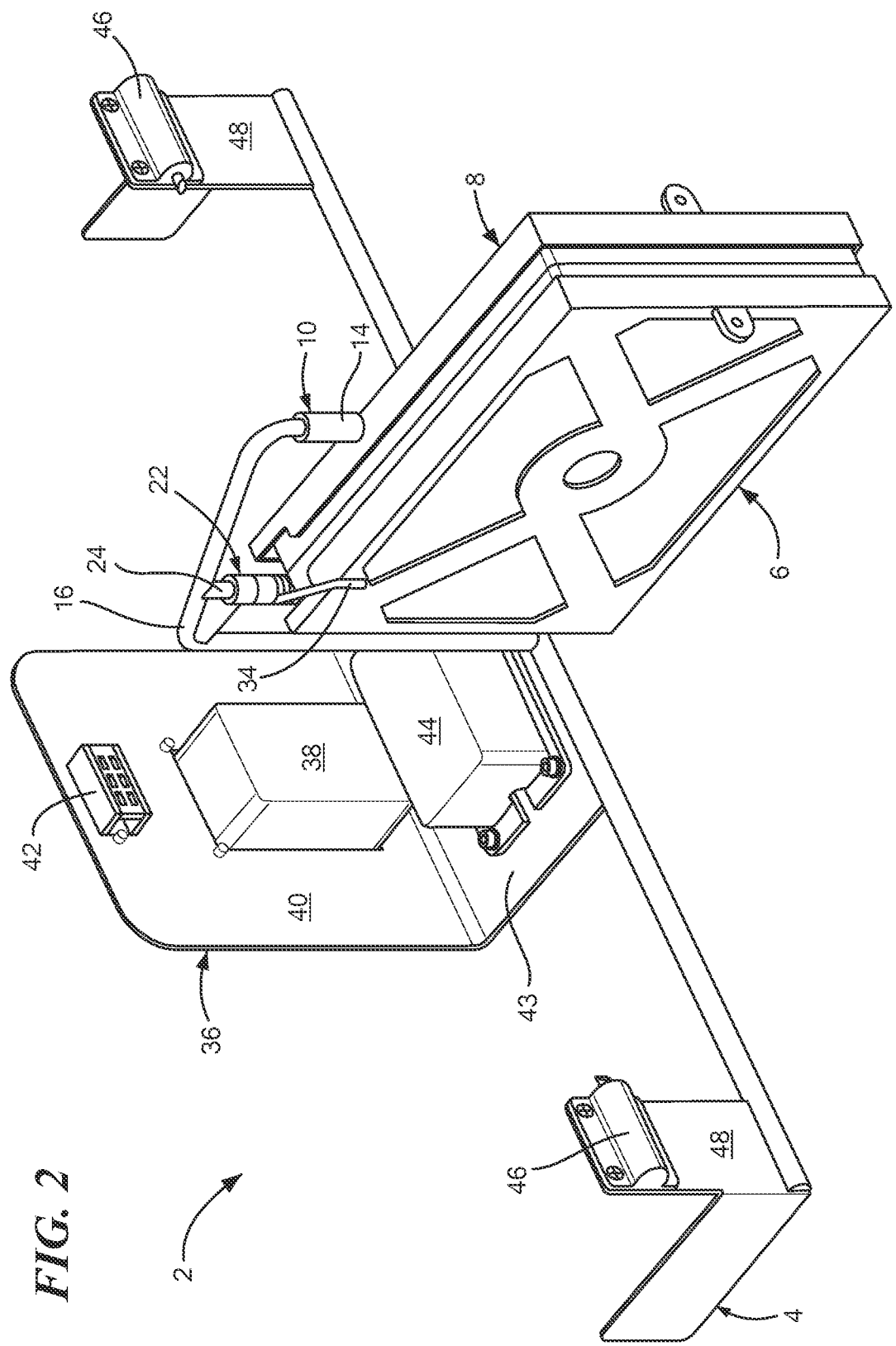
FIG. 2 is a view like FIG. 1 but shows the mouse trap in a closed operated position.
Figure 3:
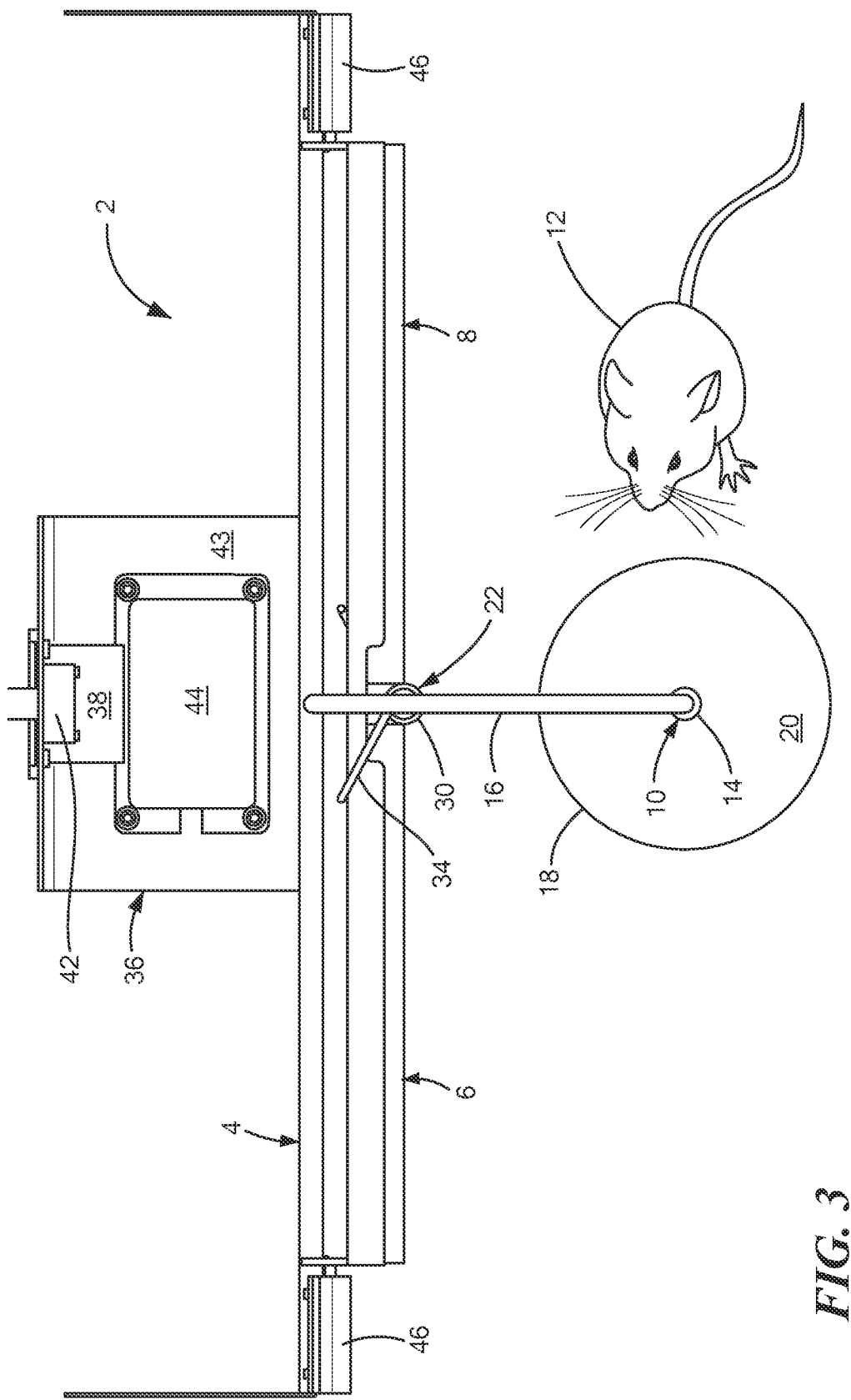
FIG. 3 is a view from above of the mouse trap as shown in FIG. 1.
Figure 4:
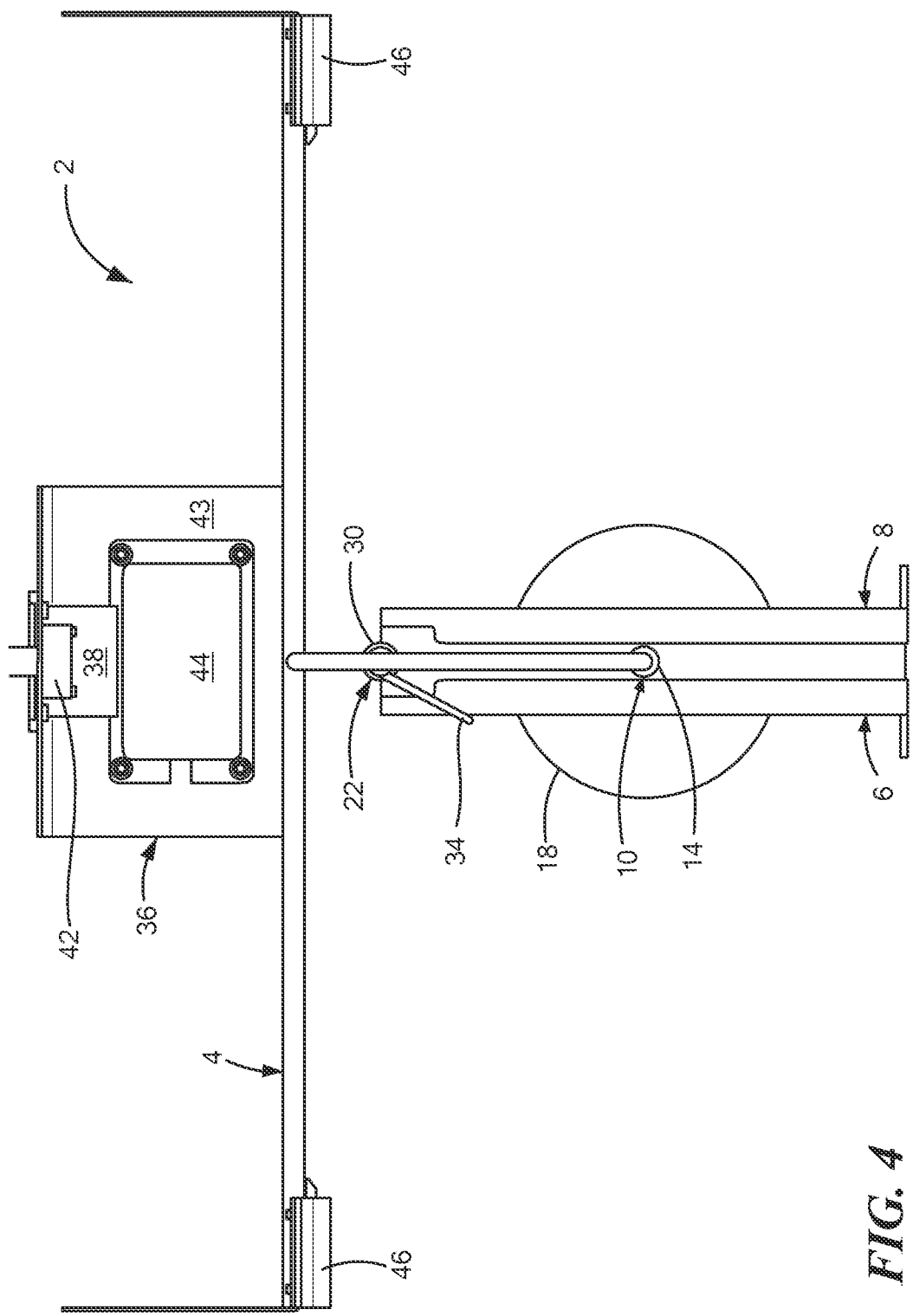
FIG. 4 is a view from above of the mouse trap as shown in FIG. 2.
Figure 5:
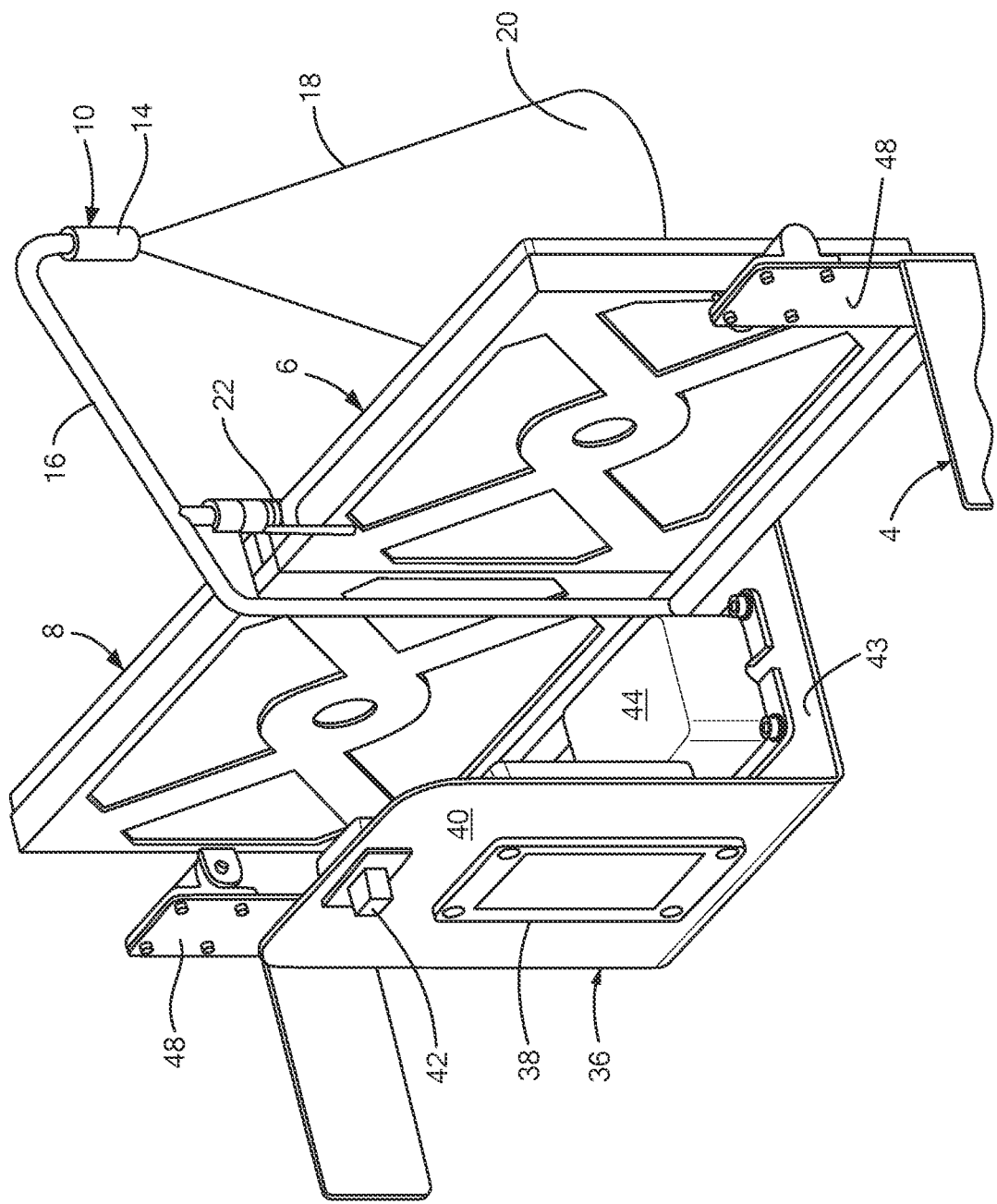
FIG. 5 is a rear perspective view of the mouse trap as shown in FIG. 1.

Referring to FIGS. 1-5, there is shown a first mouse trap 2 comprising a frame 4, a first trapping member 6 and a second trapping member 8. The mouse trap 2 further comprises actuator means 10 for causing the first and second trapping members 6, 8 to move from an open position as shown in FIGS. 1 and 3 to a closed position as shown in FIGS. 2 and 4.

The first and second trapping members 6, 8 are pivotable such that they each pivot horizontally in an arc towards each other from the open position to the closed position. The first and second trapping members 6, 8 are configured to trap a mouse 12 when the first and second trapping members 6, 8 are in the closed position.

The frame 4 is such that in use of the mouse trap 2, the frame 4 does not extend to the front of the mouse trap 2 and thus is not walked over by the mouse 12 actuating the actuator means 10. Thus, the mouse 12 does not have to walk over or climb into the mouse trap 2 and is thus not deterred from approaching the mouse trap 2.

The frame 4 also enables the mouse trap 2 to be self-standing and thus the mouse trap 2 is easily installed in a required position frequented by mice.

The actuator means 10 is an electrically-operated sensor means. The electrically-operated sensor means is a movement sensor means. Preferably the movement sensor means is a passive infrared sensor. As shown in FIGS. 1 and 2, there is one of the actuator means 10. The actuator means 10 comprises a sensing head 14 mounted on an arm 16. The arm 16 is attached to the frame 4 at an end of the arm 16 remote from the sensing head 14. The sensing head 14 provides a cone-shaped transmission 18 which defines a mouse-sensing area 20. The mouse-sensing area 20 is on a floor or other surface which will habitually be used by the mouse 12. The mouse-sensing area 20 is not a raised area forming part of mouse trap, and thus the mouse 12 is not deterred from approaching the mouse trap 2 as is often the case with known mouse traps which may have a base portion over which a mouse has to walk before a spring-biased bar moves vertically to strike the mouse. A person wishing to catch a mouse may place bait, for example peanut butter or cheese, directly on the floor in the mouse-sensing area 20, or in an appropriate container placed on the floor in the mouse-sensing area 20.

The mouse trap 2 includes a pivot arrangement 22 which extends vertically as shown. The first and second trapping members 6, 8 pivot horizontally in their arcs about the pivot arrangement 22. The pivot arrangement 22 comprises a single pivot member 24. The first and second trapping members 6, 8 are pivotally mounted about the single pivot member 24.

The first and second trapping members 6, 8 are open containers as best appreciated from FIG. 1. The first and second trapping members 6, 8 define a closed container in the closed position of the first and second trapping members 6, 8 as best appreciated from FIG. 2.

As shown in FIG. 1, in the use position, the first and second trapping members 6, 8 each comprises a vertical rear wall 26, and peripheral walls 28 which extend forwardly away from the rear wall 26. The peripheral walls 28 of the first and second trapping members 6, 8 abut each other in the closed position of the first and second trapping members 6, 8 as shown in FIG. 2. In the closed position of the first and second trapping members 6, 8, the closed container is of a size for receiving the mouse 12. The peripheral walls 28 are chamfered to give a scooping action as they close towards each other.

The first and second trapping members 6, 8 are spring biased to the closed position. More specifically, there is a first spring member 30 for the first trapping member 6, and a second spring member 32 for the second trapping member 8. The first spring member 30 has an end portion 34 which hooks over the first trapping member 6 as shown in FIG. 1. The second spring member 32 has a similar portion which hooks under the second trapping member 8. The spring member 30 has an end portion 33 which locates in an aperture 35. The second spring member 32 has a similar end portion and locating aperture arrangement. Each spring member 30, 32 is thus able to pull on its trapping member 6, 8 to obtain a fast and positive closure action of the first and second trapping members 6, 8 towards each other. The first and second spring members 30, 32 are coil springs.

The frame 4 of the mouse trap 2 includes a battery-receiving formation 36 for receiving a battery 38 for operating the actuator means 10. The battery-receiving formation 36 is an L-shaped configuration having an upstanding plate portion 40 for receiving the battery 38 and an on/off switch 42. The on/off switch 42 is a slider switch but other types of switch may be employed. The battery-receiving formation 36 also comprises a plate portion 43 for receiving a housing 44 for control electronics of the mouse trap 2. The battery 38 may act as a weight for stabilising the mouse trap 2 in use.

The first and second trapping members 6, 8 are each retained in their open position by retainer member 46. The retainer members 46 are mounted on upstanding supports 48 which form part of the frame 4. The retainer members 46 are solenoids but other types of retainer members may be employed. The retainer members 46 in the form of the solenoids each has a spring loaded moving part which retracts momentarily under an electric current from the battery in order to enable the release of the first and second trapping members 6, 8. The electric current from the battery 38 occurs when the movement sensor means senses the mouse 12 in the mouse-sensing area 20.

The mouse trap 2 is optionally such that the first and second trapping members 6, 8 are provided with an adhesive on their inner faces. The adhesive may be in the form of one or more adhesive pads. The adhesive is such as to stick to the mouse 12 and hold the mouse 12 in position.

The mouse trap 2 is optionally but preferably such that the first and second trapping members 6, 8 have edges 50 which are provided with an injury-preventing material, for example a plastics or rubber material. The injury-preventing material is for reducing a risk of the edges 50 of the first and second trapping members 6, 8 injuring a user or a pet. The injury-preventing material is preferably a foam plastics or rubber material. If desired, the entire first and second trapping members may be made of, or covered with, the injury-preventing material.

Figure 6:
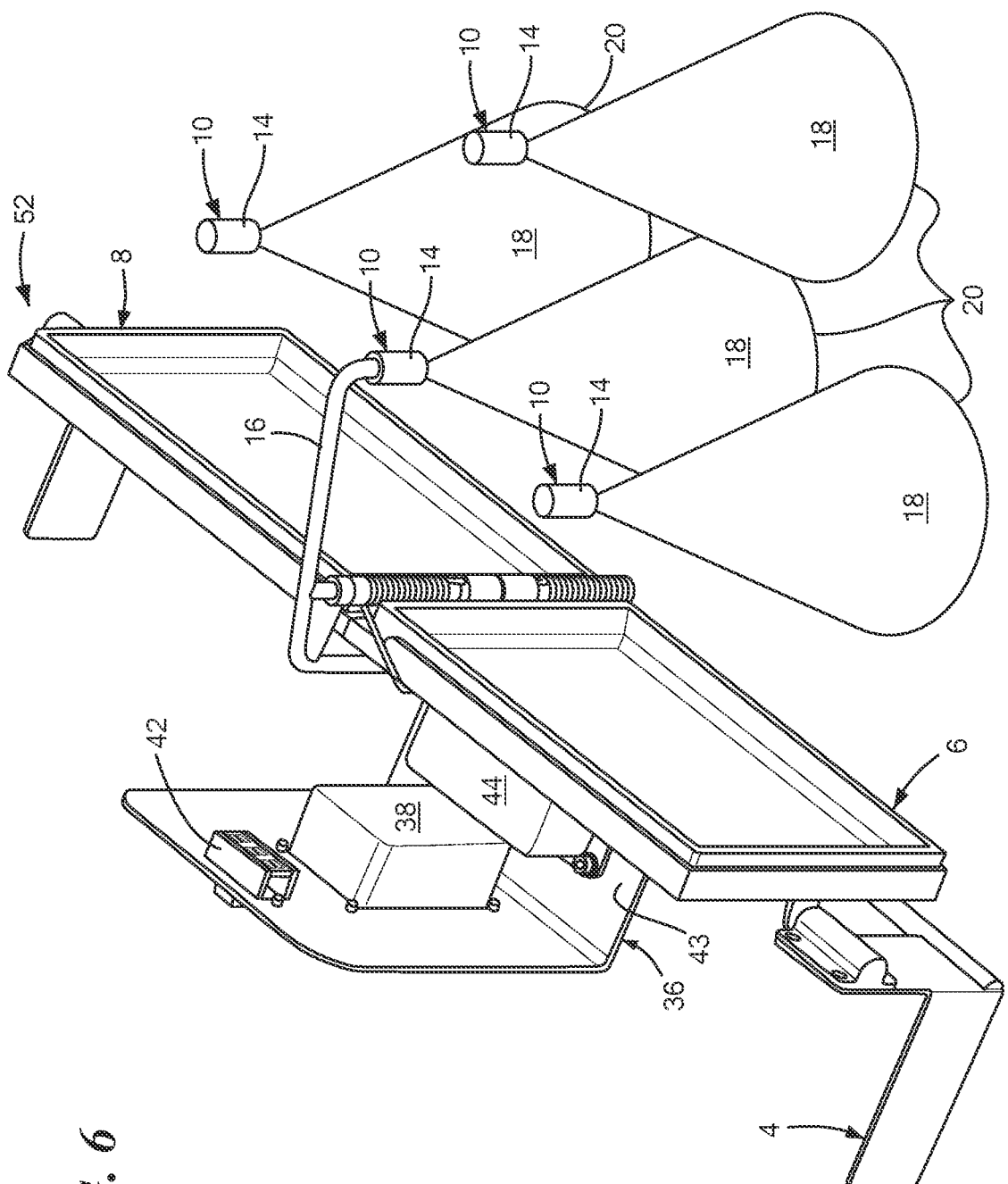
FIG. 6 is a perspective view from the front and one side of a second mouse trap of the present invention.

Referring now to FIG. 6, there is shown a second mouse trap 52 of the present invention. Similar parts as in FIGS. 1-5 have been given the same reference numerals for ease of comparison and understanding.

In the mouse trap 52, the actuator means 10 comprises an array of four of the sensing heads 14. Each sensing head 14 transmits as a cone-shaped transmission 18 to define a mouse-sensing area 20. The sensing heads 14 thus form an array of sensing heads. If the central sensing head 14 only senses a small animal such as a mouse 12 in its mouse-sensing area 20, then the sensing head 14 may operate to activate the mouse trap 52. However, if the central sensing head 14 and another sensing head 14 together sense the presence of an animal in their mouse-sensing areas 20, then this indicates the animal is larger than a mouse 12 and thus the mouse trap 2 does not operate. Thus the array of sensing heads 14 acts as a fail-safe means for preventing unwanted operation of the mouse trap 52.

Figure 7:
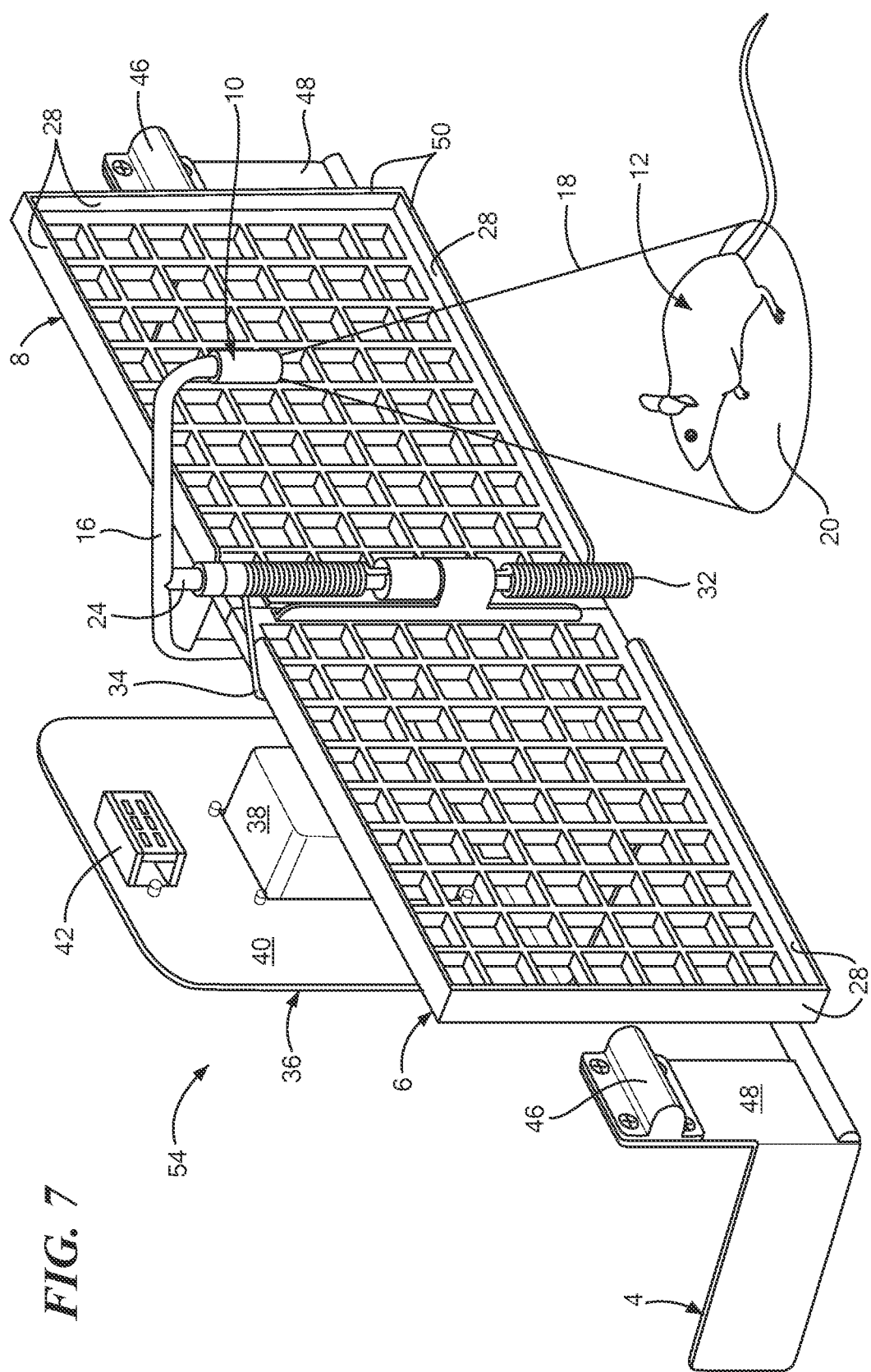
FIG. 7 shows a third mouse trap of the present invention and in an open ready-to-operate position.
Figure 8:
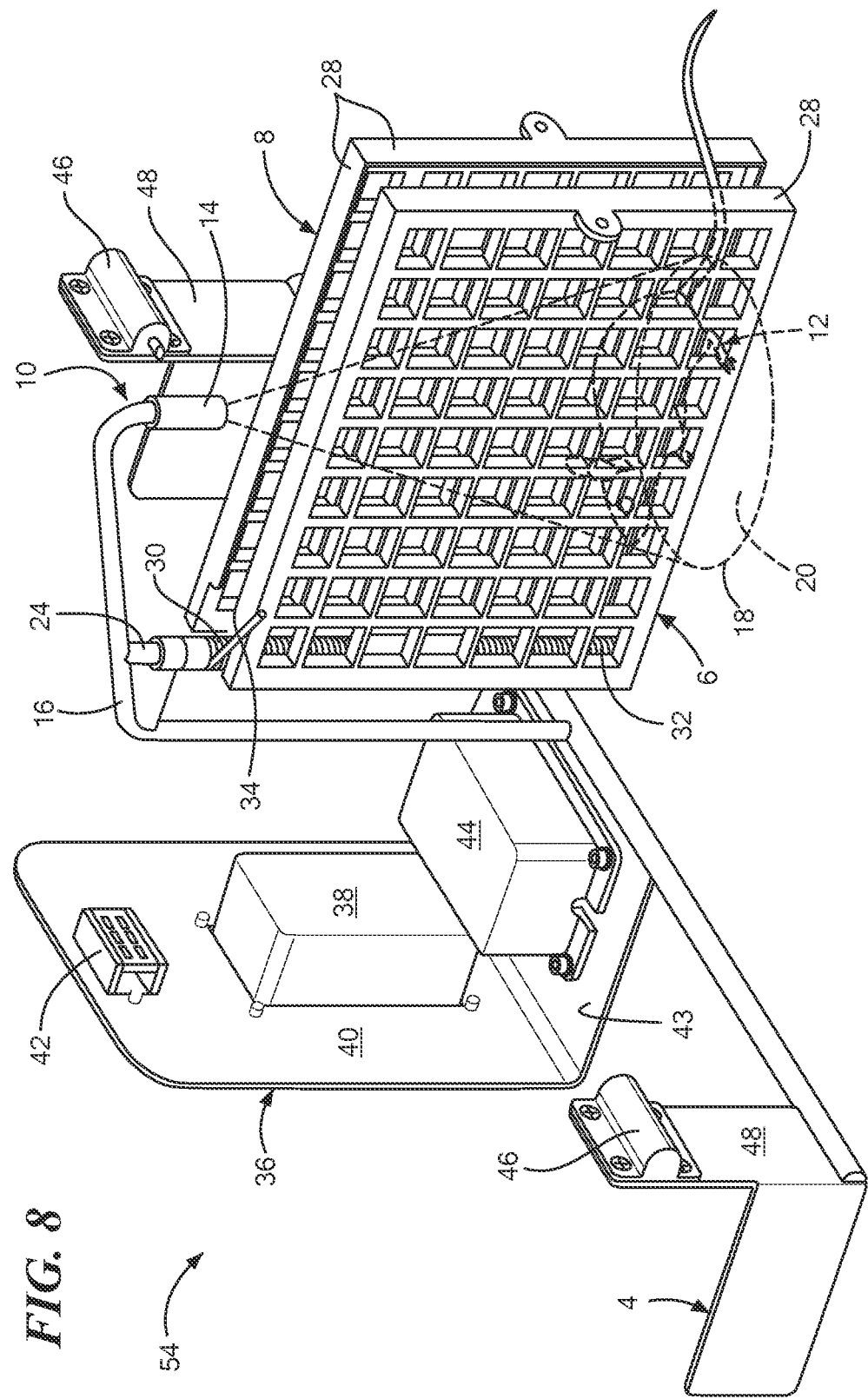
FIG. 8 is a view like FIG. 7 but shows the mouse trap in a closed operated position.

Referring now to FIGS. 7 and 8, there is shown a third mouse trap 54 of the present invention. Similar parts as in FIGS. 1-5 have been given the same reference numerals for ease of comparison and understanding.

In the mouse trap 54, it will be seen that the first and second trapping members 6, 8 have an open grid construction. The open grid construction is such as to prevent a mouse 12 from escaping when the first and second trapping members 6, 8 are in the closed position shown in FIG. 8. The open grid construction is also such as to allow air to pass through the first and second trapping members 6, 8. This minimises wind resistance to the first and second trapping members 6, 8 when they move from the open position shown in FIG. 7 to the closed position shown in FIG. 8. This may enable the first and second trapping members 6, 8 to close more quickly than would otherwise be the case and this may in itself make the mouse trap 54 of optimum efficiency in trapping mice. The first and second trapping members 6, 8 are also such that they do not have any adhesive on their inner faces. This may make the mouse trap of the present invention cheaper to produce and cheaper for re-use than a comparable mouse trap with the adhesive, for example in the form of one or more adhesive pads.

It is to be appreciated that the embodiments of the invention described above with reference to the accompanying drawings have been given by way of example only and that modifications may be effected. Thus, for example, the shape of the frame 4, the first trapping member 6 and the second trapping member 8 may differ from those shown in the drawings. Other types of actuator means 10 and other types of spring biasing means 30, 32 may be employed. The mouse trap may be one in which the actuator means may be a lever mechanism. The lever mechanism may comprise a bar that locks the first and second trapping members 6, 8 together, and whereas a solenoid formation is able to move the bar from its locking position in order to release the first and second trapping members 6, 8. Individual components shown in the drawings are not limited to use in their drawings and they may be used in other drawings and in all aspects of the invention. The invention also extends to the individual components mentioned and/or shown above, taken singly or in any combination.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A mouse trap comprising:
   a frame;
   a first and second trapping members;
   actuator means for causing the trapping members to move from an open position to a closed position,
   disposable adhesive pads provided on the inner faces of each trapping member;
   and wherein:
   the trapping members are pivotable horizontally in an arc towards each other from the open position to the closed position; and
   the trapping members are configured to trap a mouse when the trapping members are in the closed position.

2. A mouse trap according to claim 1 in which the frame is such that in use of the mouse trap, the frame does not extend to the front of the mouse trap and thus is not walked over by a mouse activating the actuator means.

3. A mouse trap according to claim 1 in which the actuator means is an electrically-operated sensor means.

4. A mouse trap according to claim 3 in which the electronically-operated sensor means is a movement sensor means.

5. A mouse trap according to claim 3 in which there is one of the electronically-operated sensor means.

6. A mouse trap according to claim 3 in which there is an array of the electronically-operated sensor means.

7. A mouse trap according to claim 1 and including a pivot arrangement which extends vertically, and in which the first and second trapping members pivot horizontally in their arcs about the pivot arrangement.

8. A mouse trap according to claim 7 in which the pivot arrangement comprises a single pivot member, and in which the first and second trapping members are mounted about the single pivot member.

9. A mouse trap according to claim 1 in which first and second trapping members form a closed container in the closed position of the first and second trapping members.

10. A mouse trap according to claim 9 in which the closed container is a sealed container, such that the trapped mouse will suffocate.

11. A mouse trap according to claim 9 in which the first and second trapping members are open containers which define the closed container in the closed position of the first and second trapping members.

12. A mouse trap according to claim 11 in which in the use position the first and second trapping members each comprises a vertical rear wall, and peripheral walls which extend forwardly away from the rear wall and which define an open mouth, and in which the peripheral walls of the first and second trapping members abut each other in the closed position of the first and second trapping members and thereby define a closed container of a size for receiving a mouse.

13. A mouse trap according to claim 1 in which the first and second trapping members are spring biased to the closed position.

14. Apparatus according to claim 1 in which there is a first spring member for the first trapping member and a second spring member for the second trapping member.

15. A mouse trap according to claim 14 in which the first spring member is a first coil spring, and in which the second spring member is a second coil spring.

16. A mouse trap according to claim 1 in which the frame includes a battery-receiving formation for receiving a battery for operating the actuator means.

17. A mouse trap according to claim 1 in which the first and second trapping members have a plastics or rubber covering over their edges in order to reduce the risk of the first and second trapping members injuring a user.

18. A mouse trap according to claim 17 in which the plastics covering is a plastics foam covering.

* * * * *